Patented Dec. 7, 1943

2,336,217

UNITED STATES PATENT OFFICE 2,336,217

VULCANIZING RUBBER AND PRODUCT OBTAINED THEREBY

Edward S. Blake, Nitro, W. Va., assignor to Monsanto Chemical Company, St. Louis, Mo., a corporation of Delaware No Drawing. Application February 26, 1941,
Serial No. 380,677

16 Claims. (Cl. 260—787)

The present invention relates to new vulcanization accelerators, to a process of vulcanizing rubber and to the vulcanized rubber products obtained with the aid of said new accelerators.

The accelerators of this invention are the monothiazyl dithiocarbonates. This class of materials is represented by the structural formula

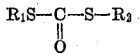

where $R_2$ may be one of a wide variety of suitable substituting groups in which carbon is linked to the sulfur as hereinafter disclosed and $R_1$ is a thiazyl radical. Typical examples of the latter comprise benzothiazyl, methyl thiazyl, methyl benzothiazyl, nitro benzothiazyl, chlor benzothiazyl, amino benzothiazyl, 4 phenyl benzothiazyl, napthothiazyl, dihydrothiazyl (thiazolyl) and 6 phenyl benzothiazyl radicals. While the aforementioned radicals are illustrative of some of the thiazyl radicals which may be employed, the invention is by no means limited thereto.

While the new compounds may be employed alone as vulcanization accelerators they are used with greater advantage in conjunction with basic nitrogen containing accelerators as activators thereof and are preferably so employed. As suitable basic nitrogen containing accelerators there may be mentioned diphenyl guanidine, di-o-tolyl guanidine, thiocarbanilide, hexamethylene tetramine, para phenylene diamine, anhydro formaldehyde aniline, diphenyl guanidine phthalate, triphenyl guanidine and butylaldehyde aniline. Again the foregoing list is by no means complete being illustrative of activators which may be used with the new accelerators but it is in nowise limitative of the invention.

The new accelerators may be prepared by methods well known to chemists. For example they may be manufactured by reacting a mercaptothiazole, usually in the form of a metallic salt such as a Zn, K or Na salt, and a thio ester of chloro carbonic acid. Somewhat better yields are obtained by carrying out the reaction in an organic solvent such as alcohol although aqueous solutions may be used where desired, in which case a water soluble salt of the thiazole should be used. A thio ester of chloro carbonic acid may in turn be prepared by reacting phosgene with a mercaptan or thio phenol. Thus, one-half molecular proportion of ethyl mercaptan was dissolved in dry decalin and this solution added to a solution of one molecular proportion of phosgene dissolved in dry decalin containing a small amount of aluminum chloride. The solutions were mixed cold as for example at 0° C. and gradually allowed to come to room temperature. After HCl had ceased to be evolved the product was distilled from the solvent under a mild vacuum and purified by distillation. Low boiling solvents have been used with equally good results in which case the solvent is removed first, preferably by distillation, and the residue purified as described. The pure thio ethyl chlor carbonate boiled at 129–132° C. This product was reacted with the sodium salt of mercaptobenzothiazole in aqueous solution and also with the potassium salt of mercaptobenzothiazole in ethyl alcohol. It will be appreciated that other solvents may be used in either step and other metallic salts or even the free mercaptothiazoles may be used where desired.

Other mercaptans and thio phenols which may be used for preparing the new accelerators include methyl mercaptan, propyl mercaptan, butyl mercaptan, amyl mercaptan, thio phenol, benzyl mercaptan, lauryl mercaptan, nitrophenyl mercaptan, thio cresol, xylyl mercaptan, pinene mercaptan and cyclohexyl mercaptan. Thus, $R_2$ in the above formula may be an alkyl, aralkyl, aryl or alicyclic radical including terpene radicals.

As specific embodiments of the invention illustrating the use of the new accelerators and the desirable results attainable thereby, but without limiting the invention, rubber stocks were compounded comprising

| | Stock | | | |
|---|---|---|---|---|
| | A | B | C | D |
| | Parts by weight | Parts by weight | Parts by weight | Parts by weight |
| Pale crepe rubber | 100 | 100 | 100 | 100 |
| Zinc oxide | 5 | 5 | 5 | 5 |
| Sulfur | 3 | 3 | 3 | 3 |
| Stearic acid | 0.5 | 0.5 | 0.5 | 0.5 |
| Benzothiazyl, benzyl dithiocarbonate | 0.75 | | | |
| Benzothiazyl, propyl dithiocarbonate | | 0.75 | | |
| Benzothiazyl, ethyl dithiocarbonate | | | 0.75 | |
| Benzothiazyl, butyl dithiocarbonate | | | | 0.75 |

The stocks so compounded were vulcanized in a press by heating for different periods of time at the temperature of twenty pounds steam pressure per square inch. The modulus and tensile properties of the cured rubber products are set forth below.

Table I

| Stock | Cure time in minutes | Modulus of elasticity in lb./in.² at elongations of— | | Tensile at break in lbs./in.² | Ult. elong., percent |
|---|---|---|---|---|---|
| | | 500% | 700% | | |
| A | 45 | 175 | 550 | 1,930 | 930 |
| B | 45 | 135 | 355 | 1,575 | 950 |
| C | 45 | 160 | 400 | 1,740 | 940 |
| D | 45 | 130 | 275 | 1,740 | 1,035 |
| A | 90 | 300 | 980 | 2,290 | 845 |
| B | 90 | 240 | 775 | 2,435 | 885 |
| C | 90 | 290 | 1,030 | 2,225 | 830 |
| D | 90 | 235 | 665 | 2,450 | 915 |

As noted, the new accelerators are used with particular advantage in conjunction with basic nitrogen containing accelerators as activators thereof. As exemplary of such use but again without limiting the invention, rubber stocks were compounded comprising

| | Stock | | | | |
|---|---|---|---|---|---|
| | E | F | G | H | J |
| | Parts by weight | Parts by weight | Parts by weight | Parts by weight | Parts by weight |
| Pale crepe rubber | 100 | 100 | 100 | 100 | 100 |
| Zinc oxide | 5 | 5 | 5 | 5 | 5 |
| Sulfur | 3 | 3 | 3 | 3 | 3 |
| Stearic acid | 0.5 | 0.5 | 0.5 | 0.5 | 0.5 |
| Diphenyl guanidine | 0.15 | 0.15 | 0.15 | 0.15 | 0.15 |
| Benzothiazyl, benzyl dithiocarbonate | 0.6 | | | | |
| Benzothiazyl, propyl dithiocarbonate | | 0.6 | | | |
| Benzothiazyl, phenyl dithiocarbonate | | | 0.6 | | |
| Benzothiazyl, ethyl dithiocarbonate | | | | 0.6 | |
| Benzothiazyl, butyl dithiocarbonate | | | | | 0.6 |

The stocks so compounded were vulcanized in the same manner as stocks A–D the vulcanizing temperature being as before, the temperature of twenty pounds of steam pressure per square inch. The modulus and tensile properties of the cured rubber products are set forth below:

Table II

| Stock | Cure time in minutes | Modulus of elasticity in lbs./in.² at elongations of— | | Tensile at break in lbs./in.² | Ult. elong., per cent |
|---|---|---|---|---|---|
| | | 500% | 700% | | |
| E | 45 | 450 | 1,740 | 3,350 | 820 |
| F | 45 | 415 | 1,700 | 3,450 | 820 |
| G | 45 | 330 | 1,230 | 2,870 | 830 |
| H | 45 | 410 | 1,860 | 3,100 | 780 |
| J | 45 | 335 | 1,160 | 3,275 | 870 |
| E | 90 | 630 | 2,450 | 3,850 | 785 |
| F | 90 | 525 | 2,255 | 3,950 | 800 |
| G | 90 | 420 | 1,670 | 3,290 | 810 |
| H | 90 | 640 | 2,650 | 3,550 | 750 |
| J | 90 | 410 | 1,460 | 3,435 | 840 |

The data set forth in Tables I and II show the desirable physical properties of vulcanizates cured in the presence of the new accelerators alone and in conjunction with basic nitrogen containing accelerators as activators thereof. Moreover, although the mixture of accelerators is effective and fast, it is not so fast in action as to produce prevulcanization or scorching of the stock during the milling, calendering or other handling operations.

Again resort may be had to other methods of preparing the new accelerators where convenient or desirable. This invention is not concerned with the preparation of the compounds and is not in any way limited thereto. Furthermore, the present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds and are apparent to those skilled in the art to which this invention pertains. The invention is limited solely by the claims attached hereto as part of the present specification.

What is claimed is:

1. The process of vulcanizing rubber which comprises incorporating into rubber, sulfur and a vulcanization accelerator comprising a monothiazyl dithiocarbonate in which the said thiazyl radical is linked through sulfur to a carbonyl radical and a radical selected from the group consisting of alkyl, aralkyl, aryl, alicyclic and terpene radicals is linked through another sulfur atom to the same carbonyl group and heating the mixture.

2. The process of vulcanizing rubber which comprises incorporating into rubber, sulfur and a vulcanization accelerator comprising a compound possessing the structural formula of

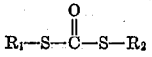

where $R_1$ is a thiazyl radical and $R_2$ is a hydrocarbon radical and heating the mixture.

3. The process of vulcanizing rubber which comprises incorporating into rubber, sulfur and a vulcanization accelerator comprising a compound posesssing the structural formula of

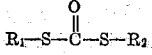

where $R_1$ is an aryl thiazyl radical and $R_2$ is a hydrocarbon radical and heating the mixture.

4. The process of vulcanizing rubber which comprises incorporating into rubber, sulfur and a vulcanization accelerator comprising a compound possessing the structural formula of

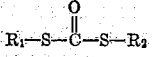

where $R_1$ is a benzothiazyl radical and $R_2$ is a hydrocarbon radical and heating the mixture.

5. The process of vulcanizing rubber which comprises incorporating into rubber, sulfur and a vulcanization accelerator comprising a compound possessing the structural formula of

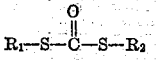

where $R_1$ is a benzothiazyl radical and $R_2$ is an aliphatic hydrocarbon radical containing less than five carbon atoms and heating the mixture.

6. The process of vulcanizing rubber which comprises incorporating into rubber, sulfur and a vulcanization accelerator comprising a compound possessing the structural formula of

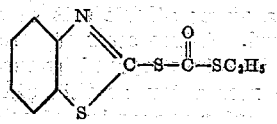

and heating the mixture.

7. The process of vulcanizing rubber which comprises incorporating into rubber, sulfur and a vulcanization accelerator comprising a compound possessing the structural formula of

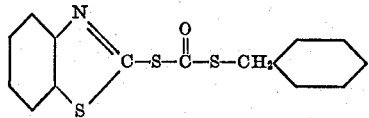

and heating the mixture.

8. The process of vulcanizing rubber which comprises incorporating into rubber, sulfur and a vulcanization accelerator comprising a compound possessing the structural formula of

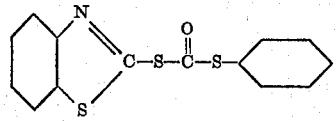

and heating the mixture.

9. The vulcanized rubber product obtained by incorporating into rubber, sulfur and a vulcanization accelerator comprising a monothiazyl dithiocarbonate in which the said thiazyl radical is linked through sulfur to a carbonyl radical and a radical selected from the group consisting of alkyl, aralkyl, aryl, alicyclic and terpene radicals is linked through another sulfur atom to the same carbonyl group and heating the mixture.

10. The vulcanized rubber product obtained by incorporating into rubber, sulfur and a vulcanization accelerator comprising a compound possessing the structural formula of

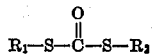

where $R_1$ is a thiazyl radical and $R_2$ is a hydrocarbon radical and heating the mixture.

11. The vulcanized rubber product obtained by incorporating into rubber, sulfur and a vulcanization accelerator comprising a compound possessing the structural formula of

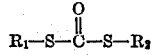

where $R_1$ is an aryl thiazyl radical and $R_2$ is a hydrocarbon radical and heating the mixture.

12. The vulcanized rubber product obtained by incorporating into rubber, sulfur and a vulcanization accelerator comprising a compound possessing the structural formula of

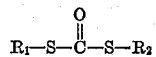

where $R_1$ is a benzothiazyl radical and $R_2$ is a hydrocarbon radical and heating the mixture.

13. The vulcanized rubber product obtained by incorporating into rubber, sulfur and a vulcanization accelerator comprising a compound possessing the structural formula of

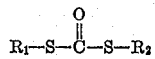

where $R_1$ is a benzothiazyl radical and $R_2$ is an aliphatic hydrocarbon radical containing less than five carbon atoms and heating the mixture.

14. The vulcanized rubber product obtained by incorporating into rubber, sulfur and a vulcanization accelerator comprising a compound possessing the structural formula of

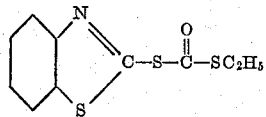

and heating the mixture.

15. The vulcanized rubber product obtained by incorporating into rubber, sulfur and a vulcanization accelerator comprising a compound possessing the structural formula of

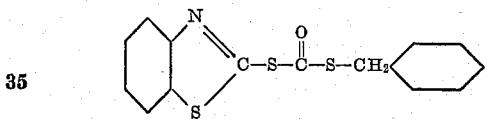

and heating the mixture.

16. The vulcanized rubber product obtained by incorporating into rubber, sulfur and a vulcanization accelerator comprising a compound possessing the structural formula of

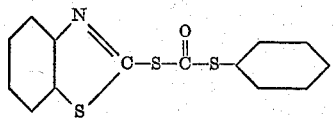

and heating the mixture.

EDWARD S. BLAKE.